United States Patent [19]
Phillips et al.

[11] 3,940,322
[45] Feb. 24, 1976

[54] ELECTROPOLYMERIZATION OF DIFUNCTIONAL MONOMERS TO FORM POLYIMIDES

[75] Inventors: David C. Phillips; William M. Alvino, both of Pittsburgh, Pa.

[73] Assignee: Westinghouse Electric Corporation, Pittsburgh, Pa.

[22] Filed: Aug. 13, 1974

[21] Appl. No.: 497,175

[52] U.S. Cl. .............................. 204/59 R; 204/72
[51] Int. Cl.² ........................................... C25B 3/00
[58] Field of Search ............ 204/59 R, 72, 73 R, 74, 204/79

[56] References Cited
UNITED STATES PATENTS

| | | | |
|---|---|---|---|
| 3,450,678 | 6/1969 | Rogers et al. .................... | 260/78 TF |
| 3,726,831 | 4/1973 | Acle et al. ....................... | 260/47 CP |
| 3,821,170 | 6/1974 | Hanson ............................. | 204/72 X |

Primary Examiner—F. C. Edmundson
Attorney, Agent, or Firm—R. D. Fuerle

[57] ABSTRACT

Monomers having both an amine group and an anhydride or two carboxylic acid or salt groups are electropolymerized in solution. In an alcohol solvent the polymer forms as a coating on the anode, and in an aprotic solvent the polymer remains in solution. The polymer is cured to form a polyimide.

13 Claims, No Drawings

ELECTROPOLYMERIZATION OF DIFUNCTIONAL MONOMERS TO FORM POLYIMIDES

BACKGROUND OF THE INVENTION

Difunctional monomers, such as 4-amino phthalic anhydride, have been polymerized with heat to form polyimides. See U.S. Pat. No. 3,450,678. Also see page 1140 of an article by Bogart and Renshaw titled "4-Amino-0-Phthalic Acid And Some of Its Derivatives" which appeared in the Journal of the American Chemical Society, Vol. 30, pages 1135 to 1144 (1908), and German Offen. Pat. Nos. 1,812,357 and 1,913,280.

Electropolymerization by condensation (e.g., loss of halogen or carbon dioxide) has been carried out with several different monomers. See pages 390 to 392 of the article by N. Yamazaki titled "Electrolytically Initiated Polymerization" which appeared on pages 377 to 400 of Advanced Polymer Science, Vol. 6 (1969). However, only a very few condensation polymers have been successfully electropolymerized since a condensation polymerization is difficult to effect electrochemically. As the Yamazaki article states on page 390 in reference to electrochemical condensation polymerization, "electrochemical reaction is not favorable for such a step-by-step reaction, since a growing polymer chain end must be affected at the electrode at each step of the reaction. Hence, only a few peculiar attempts have been found successful."

SUMMARY OF THE INVENTION

We have discovered that monomers having both an amine group and an anhydride or two carboxylic acid or salt groups can be electropolymerized.

Our electrochemical polymerization process uses less reactive, less expensive monomers than do prior thermal polymerization processes which form polyimides. The absence of heat in our process means that side reactions which can occur at high temperatures are eliminated. Another advantage is that the process permits conducting articles to be directly coated with the polymer. Such a coating does not decrease in viscosity (degrade) as polymers formed thermally in solution tend to do.

DESCRIPTION OF THE INVENTION

The monomers useful in our process have the general formula:

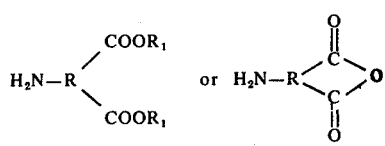

where R is a trifunctional organic group and each $R_1$ is independently selected from hydrogen and an organic salt group.

The R group is preferably aromatic or heteroaromatic as these monomers are easiest to work with, but it could also be aliphatic or alkylaryl. Aromatic R groups are particularly desirable since the resulting polymers have higher heat stabilities.

The two carboxyl or salt groups or anhydride group must be on the same carbon atom or on adjacent (vicinal) carbon atoms in order to polymerize to form a polyimide structure. Vicinal carboxyl groups are preferred as the polymerization reaction occurs more readily with vicinal carboxyl groups. The $R_1$ groups must be hydrogen or a salt group since other groups such as esters do not electropolymerize. Preferably, the two $R_1$ groups are identical since that makes the process more uniform. While inorganic salt groups such as $Na^+$, $K^+$, $NH_4^+$, $Ca^{++}$, etc., could be used, organic salt groups are preferred because inorganic salt groups may degrade the polymer. Organic salt groups are also preferred to hydrogen because they make the solution more conductive which means that lower voltages are required and the polymerization is faster. Also, the monomers with salt groups tend to be more soluble than monomers with acid groups.

Of the organic salt groups, those most preferred are formed from tertiary amines or imidazoles. Examples include triethyl amine, trimethylamine, N, N-dimethylbenzylamine, tri-n-propylamine, tri-n-butylamine, N-ethylpiperidine, N-alkylpiperidine, N-ethylmorpholine, N,N-diethyl-m-toluidine, N,N-diethyl-p-toluidine, N-allylmorpholine, N,N-diethylaniline, pyridine, imidazole, 1-methylimidazole, 4-methylimidazole, 5-methylimidazole, 1-propylimidazole, 1,2-dimethylimidazole, 1-ethyl-2-methylimidazole, and 1-phenylimidazole. Since the salt group is not present in the final polyimide anyway, the alkyl to C4 salt groups are usually most convenient to use and less expensive. Monomer salts of tertiary amines are prepared by simply adding excess tertiary amine to the monomer acid.

Examples of suitable monomers include 4-amino phthalic acid (4-APA), its triethyl amine salt, and the triethyl amine salts of para $H_2N\phi CONH$ $\phi$ $(COOH)_2$ and of meta and para $H_2N\phi CO\phi$ $(COOH)_2$. Mixtures of monomers may also be used but are not preferred as the polymerization may not be uniform.

A solution is formed of the monomer in a suitable solvent. The solution should contain at least about 10 percent (all percentages herein are by weight) monomer since a solution of less monomer is simply a waste of solvent, although it can still be used. The upper limit on the monomer concentration is its solubility in the solvent. Generally, the solution should be as concentrated as it is feasible to work with because higher solids mean better yields.

If the solvent is aprotic the resulting polymer will primarily be formed in the solution. Almost any aprotic solvent may be used. Examples include dimethyl sulfoxide, dimethyl acetamide (DMAC), pyrrolidone, N-methyl-2-pyrrolidone (NMP), N-methyl formamide, dimethyl formamide, pyridine, etc. Mixtures of solvents can also be used.

If the solvent is an alcohol the polymer will primarily be deposited as a coating on the anode electrode. Thus, the process can be used to coat almost any conductor, including sheets, wire, metal objects, etc. Examples of suitable alcohols include the alkanols such as methanol, ethanol, propanol, isopropanol, etc. Glycols such as ethylene glycol can also be used, but the alkanols to $C_5$ are preferred. Mixtures of alcohols can also be used.

The solution is placed in a suitable cell having conductive electrodes, preferably of platinum. The distance between the electrodes is determined by the current density desired, but about ½ to 6 inches is typical and about 1 inch is usually suitable.

A D.C. current is passed through the solution at a current density of generally about 0.2 to about 25 $mA/cm^2$, where the calculation of the current density is based on the total surface area of the electrode. At less than about 0.2 mA/cm² the current has very little effect and at more than about 25 mA/cm² the additional current causes very little additional polymer to be formed. The voltage, of course, will vary depending on the resistance of the solution, but generally about 1 to about 200 volts are required. The time required to coat the electrode to the desired thickness or to polymerize substantially all of the monomer in a solution will generally be between about ½ to about 4 hours, about 2 hours being most usual. Of course, it is possible to add more monomer as the supply is depleted.

The temperature during polymerization should be kept low, usually between about 20° to about 50°C, in order to avoid competing side reactions which may occur at higher temperatures. Usually no pH adjustment or catalyst is required.

While the details of the polymerization reaction are not known, the general reaction can be represented as:

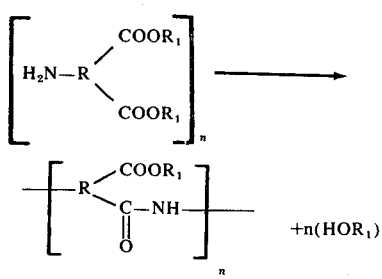

If the polyamic acid (or salt if $R_1$ is not hydrogen) is formed in solution it is collected, for example, by pouring into a non-solvent such as ethyl acetate, followed by decantation, evaporation, or both.

The polyamic acid is cured in the same way that any other polyimide is cured, about ½ to about 1 hour at about 100 to about 300°C being satisfactory. The cure reaction is believed to be:

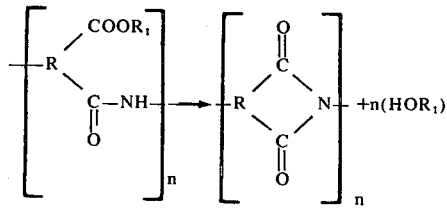

Although films which have been made from the polymer have been brittle due to the polymer's low molecular weight, it is believed that high molecular weight polymers (and therefore better films) can be made as the process is refined. The polymers are nevertheless useful as coatings in applications where flexibility is not important such as for coatings on rigid materials. Also, the addition of flexibilizers may make the polymers more flexible.

The following examples further illustrate the invention.

EXAMPLE 1

4-amino phthalic acid was prepared by adding 3g. of 5 percent palladium-charcoal catalyst, 600 cc ethanol, and 400 cc distilled water to 170 g of 4-nitro phthalic acid. The mixture was placed in a Paar bomb at 60°C and the 4-nitro phthalic acid was reduced with hydrogen. The dark amber solution was filtered to remove catalyst and refiltered through Celite (a diatomaceous earth filter aid) to produce a light amber solution. The solvent was evaporated to give an 86 percent yield of a yellow precipitate which was recrystallized from an acetic acid-water mixture to give a light yellow powder. The powder exhibited a broad endotherm at 200°C.

440g. of a 10 percent solution of the above-produced 4-amino phthalic acid in dimethylacetamide was prepared and placed in a glass cell maintained at 20°C by means of an outer water-cooled jacket. The cell was equipped with Teflon stirrer, nitrogen inlet and outlet and contained two identical 2.0 × 5.0 cm platinum foil electrodes 4.0 cm apart.

A constant D.C. current of 50mA was passed through the solution. Samples of 50ml were withdrawn every 10 minutes and analyzed by viscosity, infrared, and gravimetric analysis for polymer characterization. After 2 hours the polymer was precipitated by pouring the solution into ethyl acetate. The ethyl acetate was decanted and the polymer was dried under vacuum at 60°C for 15 hours.

The polymer was a viscous liquid (inherent viscosity = 0.28 dl/g). The liquid was spread in an aluminum dish, then cured for 1 hour at about 100° to 300°C. A brittle, dark amber film resulted.

Thermal gravitametric analysis was performed on the imide polymer. The peak weight loss as the temperature of the polymer was raised at a rate of 10°C/min. occurred at about 600°C in air and about 671°C in nitrogen.

EXAMPLE 2

Example 1 was repeated using other monomers and conditions. The following table gives the results. All monomer solutions were at 9 percent solids in DMAC.

| Monomer | Initial Viscosity (dl/g.) | Time (Hours) | Current (mA) | PH Initial | Final | Comments |
|---|---|---|---|---|---|---|
| 4-APA-HCl | 0.14 | 12 | 100 | 3.9 | 2.2 | Dark amber brittle film |
| triethyl amine salt of 4-APA | 0.20 | 10 | 100 | 8.3 | 5.5 | '' |
| ammonium salt of 4-APA | — | 4 | 100 | acidic | | Opaque powdery film |

All salts in the above table were di-substituted.

EXAMPLE 3

Example 1 was repeated using other monomers and reaction conditions. The following table gives the results. All solutions were at 9 percent solids in DMAC.

| Monomer | Time (Hours) | Current (mA) | pH Before | pH After |
|---|---|---|---|---|
| triethyl amine salt of 4-APA | 10 | 100 | 8.3 | 5.5 |
| hydrochloride salt of 4-APA | 12 | 100 | 3.9 | 2.2 |
| triethyl amine salt of 4-APA | 4 | 100 | basic | unchanged |
| 4-APA | 2 | 50 | | |
| hydrochloride salt of 4-APA | 4 | 100 | acid | more acid |
| triethyl amine salt of 4-APA | 2 | 500 | 9.4 | 8.4 |
| triethyl amine salt of 4-APA | 2 | 1000 | 9.4 | 9.2 |
| triethyl amine salt of 4-APA | 2 | 50 | 9.2 | 9.2 |

All salts in the above table were di-substituted.
As in Example 1, films were made by pouring the polymer into an aluminum dish and curing. Brittle films were produced as in Example 1.

EXAMPLE 4

The compound p-$NO_2\phi CONH\phi$ $(COOH)_2$ was prepared by adding 9.25g. (0.05m) of p-$NO_2$ $\phi COCl$ in 50cc of benzene to a stirred solution of 9.05g. (0.05m) 4-aminophthalic acid in 50cc dimethylacetamide. The temperature rose from 30° to 50°C and the solution was heated to 60°C for about 5 minutes. The solution was cooled to room temperature and 100cc of ethanol and 500cc of water were added. A tan precipitate separated which was filtered, washed with ethanol and water, and dried under vacuum at 80°C for 15 hours. The DTA (differential thermal analysis) melting point was 243°C.

The monomer p-$H_2N\phi CONH\phi$ $(COOH)_2$ was prepared by the catalytic hydrogenation of p-$NO_2\phi\lambda$ CONH$\phi$ $(COOH)_2$. A paar bomb was charged with 9.86g (0.03m) of p-$NO_2\phi CONH\phi$ $(COOH)_2$, 70cc ethanol, 100cc water, 20cc DMAC, and 0.4 gm 5 percent palladium on charcoal as a catalyst. Reduction was carried out at 70°C and 50 psig. The solution was filtered through Celite. The pale yellow filtrate was cooled and a beige precipitate separated which was filtered and dried. DTA m.p. = 229°C.

The polymerization of the monomer and cure of the polymer generally followed the techniques described in Example 1.

A number of conditions were used, first to duplicate previous results and second to try to improve the polymerization process. While we feel we have improved the process, we have not optimized the system. In Table I are listed the preliminary reactions that were run.

In Table I the solutions were at 6.5 percent solids. In all of the electrochemical reactions listed in Table I, only a very small amount of deposit appeared at the anode. The DMAC is a solvent for the polymer so that as soon as the polymer was formed, it became soluble in the medium. In addition, viscous materials were obtained after work up of the reaction mixture. These viscous materials were low molecular substances that yielded brittle films when baked out in aluminum dishes and cured to 150°C.

In an effort to overcome these deficiencies, we changed to a different solvent system and used different monomers. Table II summarizes these reactions.

Unlike those reactions run in DMAC as listed in Table I, all of the reactions listed in Table II produced a heavy deposit at the anode. At first a thin amber colored film would be deposited on the anode. Gradually the film would become thicker and coarser in character and the coated anode would then exhibit discontinuities. Infrared spectral analysis showed that this deposit was the amide conversion product from the starting amino-acid. This deposit, when cured to 300°C, was converted to the imide structure. However, the film was brittle. The solvent used in Table II was ethanol.

TABLE I

| Monomer | Solvent | Reaction Time (Minutes) | Reaction Temperature (°C) | Voltage (V) | Current (mA) | Comments |
|---|---|---|---|---|---|---|
| 4-APA | DMAC | 90 | 20–29 | 160 · 120 | 30 | Dark solution. Gassing at cathode. Some deposit at anode. |
| triethyl amine salt of 4-APA* | DMAC | 90 | 20–26 | 5 | 30 | '' |
| benzyl dimethyl amine sale of 4-APA* | DMAC | 90 | 20–25 | 10 | 50 | '' |
| triethyl amine salt of 4-APA* | DMAC | 90 | 21–28 | 10 → 8 | 50 | '' |
| triethyl amine salt of p-$H_2NOCONHO(COOH)_2$* | DMAC | 90 | 24–27 | 10 | 50 | '' |
| 4-APA with 0.2 mole% ZnCl2 catalyst | DMAC | 120 | 25–33 | 120 → 70 | 50 | Gray deposit on cathode |
| triethyl amine salt of 4-APA | NMP | 120 | 25–26 | 17–15 | 100 | Dark solution. Gassing at cathode. Some deposit at anode. |

All salts in Table I were di-substituted except those marked with an asterisk which were mono-substituted. Arrows in the voltage column indicate initial and final voltage.

TABLE II

| Monomer | % Solids | Reaction Time (Minutes) | Reaction Temp. (°C) | Voltage (V) | Current (mA) |
| --- | --- | --- | --- | --- | --- |
| 4-APA triethyl amine salt of 4-APA* | 5.8 | 60 | 22–30 | 15 | 100 |
| triethyl amine salt of p-$H_2N\phi COHN\phi(COOH)_2$* | 5.8 | 30 | 25–30 | 30–25 | 200 |
| triethyl amine salt of m-$H_2N\phi CO\phi(COOH)_2$ | 5 | 30 | 20–33 | 60→50 | 200 |
| triethyl amine salt of p-$H_2N\phi CO\phi(COOH)_2$ | 5 | 30 | 22–40 | 40→35 | 200 |
|  | 5 | 30 | 24–44 | 60→50 | 200 |

*mono-substituted

What we claim is:

1. A method of polymerizing a monomer having a general formula selected from the group consisting of:

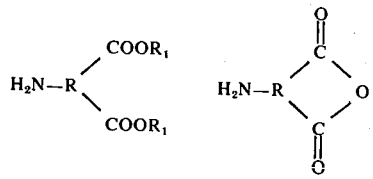

and mixtures thereof, where R is a trifunctional organic group and each $R_1$ is independently selected from hydrogen and salt groups, said $COOR_1$ and —CO— groups being viscinal or on the same carbon atom of R, comprising:
  1. forming a solution of said monomer in a suitable non-interfering solvent organic; and
  2. passing a direct electrical current through said solution at a current density of at least about 0.2 mA/cm².

2. A method according to claim 1 wherein R is alphatic, alklyaryl, aromatic, or hetero-aromatic.

3. A method according to claim 2 wherein said monomer is a salt of 4-amino phthalic acid.

4. A method according to claim 1 wherein said monomer has the general formula

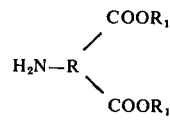

where R is a trifunctional organic group and $R_1$ is an organic salt group.

5. A method according to claim 4 wherein $R_1$ is an alkyl salt group or an aryl salt group.

6. A method according to claim 5 wherein $R_1$ is a tertiary amine group or an imidazole group.

7. A method according to claim 1 wherein said solvent is an alcohol.

8. A method according to claim 1 wherein said solvent is aprotic.

9. A method according to claim 1 wherein said current has a density of about 0.2 to about 25 mA/cm².

10. A method according to claim 1 wherein monomer is continuously added to the solution to replace monomer which has polymerized, and polymerized monomer is continuously removed from the solution.

11. A method according to claim 1 wherein the temperature of said solution is maintained at about 20° to about 50°C.

12. A method according to claim 1 wherein said electrical current is passed between electrodes about ½ to about 6 inches apart for ½ to about 4 hours at about 1 to about 200 volts.

13. A method according to claim 1 including the additional step of curing the polymerized monomer at about 100° to about 300°C for about ½ to about 1 hour.

* * * * *